(12) United States Patent
Cornelissen (10) Patent No.: US 9,976,690 B2
(45) Date of Patent: May 22, 2018

(54) FOOT OF A DEVICE, IN PARTICULAR OF A TABLE-TOP KITCHEN APPLIANCE

(71) Applicant: Vorwerk & Co. Interholding GmbH, Wuppertal (DE)

(72) Inventor: Markus Cornelissen, Bornheim (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 0 days. days.

(21) Appl. No.: 14/932,048

(22) Filed: Nov. 4, 2015

(65) Prior Publication Data

US 2016/0131300 A1    May 12, 2016

(30) Foreign Application Priority Data

Nov. 6, 2014    (DE) .......................... 10 2014 116 210

(51) Int. Cl.
*F16M 7/00*    (2006.01)
*F16F 1/373*   (2006.01)
(Continued)

(52) U.S. Cl.
CPC ............... *F16M 7/00* (2013.01); *A47B 91/04* (2013.01); *A47J 43/07* (2013.01); *A47J 43/0716* (2013.01);
(Continued)

(58) Field of Classification Search
CPC ....... A47B 91/00; A47B 91/06; A47B 91/024; A47B 91/04; A47B 91/16; D06F 39/125;
(Continued)

(56) References Cited

U.S. PATENT DOCUMENTS

RE14,964 E  * 10/1920  Anderson .............. A47B 91/04
                                                      16/42 R
2,202,940 A  *  6/1940  Armington ............ F16F 1/3713
                                                      267/141.3
(Continued)

FOREIGN PATENT DOCUMENTS

EP    2 659 810 A1   11/2012
GB    13 78 758 A    12/1974

OTHER PUBLICATIONS

Din En 826, "Thermal insulating products for building applications—Determination of compression behaviour," May 2013, total of 15 pages.
(Continued)

*Primary Examiner* — Stanton L Krycinski
*Assistant Examiner* — Taylor L Morris
(74) *Attorney, Agent, or Firm* — Collard & Roe, P.C.

(57) ABSTRACT

The invention relates to a foot (6) of a device, in particular of a table-top kitchen appliance (1), wherein the device has a housing (5) comprising an appendage (9), which projects downwards in the case of a common setup, which rests on a foot part (12), which forms a base (10), by interlaying a soft part (25), wherein the soft part (25) is received in a shell section (18) of the foot part (12), which is open to the top, and the appendage, which projects into the shell section, is also movably received in the shell section at right angles to a deflection movement as a result of a weight force of the device, wherein the soft part furthermore forms an upper impact surface (27) for the appendage (9). To attain a better position of the device in response to movement, it is proposed that, starting at the impact surface, the soft part (25) is to also be embodied without a weight-loading by the appendage (9), also laterally to the appendage (9) on the top.

8 Claims, 7 Drawing Sheets

(51) Int. Cl.

| | |
|---|---|
| A47B 91/04 | (2006.01) |
| A47J 43/07 | (2006.01) |
| A47J 47/16 | (2006.01) |
| A47J 43/04 | (2006.01) |
| F16F 1/44 | (2006.01) |
| F16F 1/36 | (2006.01) |
| A47B 91/08 | (2006.01) |
| A47B 91/00 | (2006.01) |
| A47B 91/06 | (2006.01) |

(52) U.S. Cl.
CPC ............ *A47J 47/16* (2013.01); *F16F 1/3732* (2013.01); *A47B 91/00* (2013.01); *A47B 91/06* (2013.01); *F16F 1/3615* (2013.01); *F16F 1/445* (2013.01); *F16M 2200/08* (2013.01)

(58) Field of Classification Search
CPC .......... F16F 15/04; F16F 15/08; F16F 1/3732; F16F 1/1445; G06F 1/166; F16M 11/36; F16M 7/00; F16M 2200/08
USPC .... 248/188.1–188.3, 188.8, 188.9, 615, 634, 248/635, 677, 688, 638
See application file for complete search history.

(56) References Cited

U.S. PATENT DOCUMENTS

| | | | | |
|---|---|---|---|---|
| 2,267,172 | A * | 12/1941 | Saurer | F16F 1/445 267/141.3 |
| 2,448,281 | A * | 8/1948 | Saurer | F16F 1/3732 248/611 |
| 2,513,193 | A * | 6/1950 | Miller | A47B 91/04 16/38 |
| 2,538,658 | A * | 1/1951 | Saurer | F16F 1/3732 264/262 |
| 2,589,796 | A * | 3/1952 | Geldhof | D06F 37/24 248/559 |
| 2,631,330 | A * | 3/1953 | Becker | A47B 91/04 16/30 |
| 2,642,252 | A * | 6/1953 | Pietz | F16F 1/3732 267/140.3 |
| 2,767,944 | A * | 10/1956 | Moore | D06F 39/125 16/19 |
| 2,941,766 | A * | 6/1960 | Van Ranst | F16F 1/3814 267/141.7 |
| 3,052,435 | A * | 9/1962 | Roller | F16F 3/10 248/569 |
| 3,235,244 | A * | 2/1966 | Hein | B63C 5/04 114/219 |
| 3,346,221 | A * | 10/1967 | Farmer | C08J 9/42 174/544 |
| 3,351,309 | A * | 11/1967 | Harrison | F16F 1/3615 248/635 |
| 3,369,802 | A * | 2/1968 | Wallace | F16F 1/445 188/268 |
| 3,717,318 | A | 2/1973 | Yamasita | |
| 4,067,525 | A * | 1/1978 | Allen | F16F 1/3732 248/632 |
| 4,076,194 | A * | 2/1978 | Feucht | B62D 55/1086 248/569 |
| 4,134,561 | A * | 1/1979 | Atkinson | F16F 1/445 248/632 |
| 4,196,775 | A * | 4/1980 | Groh | H01L 23/473 165/168 |
| 4,358,098 | A * | 11/1982 | Ceseri | F16F 1/3732 267/141.5 |
| 4,407,491 | A * | 10/1983 | Kunihiro | F16F 13/20 267/140.13 |
| 4,923,158 | A * | 5/1990 | Saisho | A47B 91/00 248/188.8 |
| 5,242,147 | A * | 9/1993 | Kemeny | F16F 7/08 248/635 |
| 5,265,552 | A * | 11/1993 | Taylor | B63G 8/39 114/219 |
| 5,344,116 | A * | 9/1994 | Winkler | F16M 7/00 248/188.3 |
| 5,499,791 | A * | 3/1996 | Nakagawa | D06F 39/125 248/616 |
| 5,577,703 | A * | 11/1996 | Young | F16M 7/00 248/188.4 |
| 5,946,947 | A * | 9/1999 | Lee | D06F 37/20 68/23.1 |
| 5,957,427 | A * | 9/1999 | Hanson | F16F 7/00 248/634 |
| 6,070,381 | A * | 6/2000 | Blumer | E04F 15/22 156/71 |
| 6,138,979 | A * | 10/2000 | Morman | A47B 91/00 248/188.4 |
| 6,695,295 | B2 * | 2/2004 | Williams | B29C 45/14491 267/140.13 |
| 6,820,908 | B1 * | 11/2004 | Tousi | F16F 15/08 248/609 |
| 7,263,806 | B2 * | 9/2007 | Pellegrino | A47B 47/021 248/564 |
| 7,454,928 | B2 * | 11/2008 | Houser | D06F 37/24 188/268 |
| 7,484,707 | B2 * | 2/2009 | Lee | A47B 91/04 248/188.5 |
| 7,744,050 | B2 * | 6/2010 | de Toledo | A47L 15/4253 248/188.3 |
| 7,918,438 | B2 * | 4/2011 | Sato | F16F 1/38 248/634 |
| 8,511,637 | B2 * | 8/2013 | Mitsch | F01D 25/28 248/615 |
| 2002/0190185 | A1 * | 12/2002 | Ropp | G02B 27/0101 248/549 |
| 2005/0279895 | A1 * | 12/2005 | Lee | A47B 91/04 248/188.8 |
| 2007/0069435 | A1 * | 3/2007 | Aspengren | B61F 5/142 267/293 |
| 2016/0174708 | A1 * | 6/2016 | Bushey | A47B 91/06 16/42 R |

OTHER PUBLICATIONS

Din 53 513, "Determination of viscoelastic properties of elastomers on exposure to forced vibration at non-resonant requencies," Mar. 1990, total of 7 pages.
Din En Iso 1798 (Previous Edition Din 53571), "Flexible cellular polymeric materials—Determination of tensile strength and elongation at break," Apr. 2008, total of 16 pages.

* cited by examiner

FOOT OF A DEVICE, IN PARTICULAR OF A TABLE-TOP KITCHEN APPLIANCE

CROSS REFERENCE TO RELATED APPLICATIONS

Applicant claims priority under 35 U.S.C. § 119 of German Application No. 10 2014 116 210.2 filed on Nov. 6, 2014, the disclosure of which is incorporated by reference.

The invention relates to a foot of a device, in particular of a table-top kitchen appliance, wherein the device has a housing comprising an appendage, which projects downwards in the case of a common setup, which rests on a foot part, which forms a base, by interlaying a soft part, wherein the soft part is received in a shell section of the foot part, which is open to the top, and the appendage, which projects into the shell section, is also movably received in the shell section at right angles to a deflection movement as a result of a weight force of the device, wherein the soft part furthermore forms an upper impact surface for the appendage.

The invention furthermore relates to a foot of a device, in particular of a table-top kitchen appliance, wherein the device has a housing, comprising an appendage, which projects downwards in the case of a common setup, which rests on a foot part, which forms a base, by interlaying a soft part, wherein the soft part is received in a shell section of the foot part, which is open to the top.

Such feet have already become known in various forms. A foot, in the case of which the appendage rests on a shell part, which is open to the bottom, and in the case of which a soft part, which ultimately forms the base, is received in the lower opening of the shell part, is known from GB-A-13 78 758. The appendage is furthermore fastened in a further second shell part, which overlaps the first shell part in parallel, wherein a movement at right angles to a deflection movement is virtually impossible as a result of a weight force. Insofar as such a movement does nonetheless occur to a very small extent, the shell workpieces, which consist of hard material, rest directly against one another at the same time.

A foot, in the case of which provision is made for shell parts, which are arranged on top of one another so as to nest inside one another in a comparable manner and which open towards the bottom in each case, is known from U.S. Pat. No. 3,717,318. In contrast to the afore-described prior art, only the movement of the shell parts at right angles to a deflection movement, which is at hand as a result of a weight force, is cushioned by means of a further soft part.

With regard to the prior art, reference is to furthermore be made to EP-A1-2 659 810. In the case of the foot known therefrom, the appendage, which projects into the shell part, is also movably received in the shell part at right angles to a deflection movement as a result of the weight force of the device. In response to such a movement, said foot initially and mainly interacts directly with the soft part, which is received in the shell section. Without the effect of a weight-loading from the device, the appendage only rests on an impact surface of the soft part and, in a further area, extends laterally to the area of the soft part, which adjoins downwards with regard to the bearing surface. Provision is not made in the further area on the front side of the appendage for an embodiment of the soft part.

Based on the afore-described prior art, the invention deals with the task of specifying an embodiment of a foot, which is advantageous with regard to cushioning movements.

According to a first teaching of the invention, this task is solved in an embodiment, which focuses on the fact that, starting at the impact surface, the soft part is also embodied without a weight-loading by the appendage, also laterally to the appendage on the top.

A shell-like design of the soft part is quasi also specified with this. On the end side, the appendage is surrounded across its length by the soft part, also with regard to the part, which only rests on the impact surface. In the mentioned area, the same part of the appendage can be cushioned laterally to a direction of action of the weight force and vertically in the direction of the weight force by means of the soft part. A separate part of the appendage, which extends further downwards relative to the mentioned impact surface—again viewed without a weight-loading, is not required. In the mentioned area, the appendage can move relative to the soft part, also relative to the area of the soft part, which extends laterally to the appendage, above the impact surface. The appendage is not connected to the soft part in the mentioned area, so that even though a movement in a direction at right angles to the deflection movement can lead to a compression of the area of the soft part, which extends laterally to the appendage in the mentioned area, as a result of the weight force, it cannot simultaneously lead to a tensile load on the soft part on the opposite side.

The task is furthermore also solved in an embodiment, which focuses on the fact that the appendage rests on the soft part by means of a hard part, which is clamp-mounted by the soft part by lateral enclosure. The lateral extension of the soft part with regard to the appendage, which is attached from the top, is initially also attained through this, but an advantageous assembly is simultaneously also attained due to the fact that the soft part only clamp-mounts the hard part. Even though the hard part is ultimately also mounted as a result of the fastening of the foot to the device by means of the appendage in a use state of the device, the hard part is already mounted to the shell part in the course of the assembly, without requiring special measures. An advantageous preassembly of the component shell part, soft part and hard part is at hand.

This task is also solved in an embodiment, which focuses on the fact that the soft part is embodied in several parts and that a further part is received in a shell section of the appendage, which is open to the bottom.

In addition, the task is solved in an embodiment, which focuses on the fact that the soft part completely fills a free bottom surface of the shell part and also extends laterally to the appendage on the top only as a result of deformation in response to weight-loading.

Further features of the invention will be disclosed below, also in the description of the figures and in the drawing.

If a hard part is provided, it is furthermore preferred for a lateral interaction of the appendage with the soft part to only be made possible above the hard part. Preferably, the appendage accordingly does not permeate the hard part. In fact, it more preferably rests on the hard part only in a frictionally engaged manner.

The soft part can be formed based on a disk part, wherein an edge area of the disk part is folded upwards in the use state, if an extension is also at hand above the impact surface. Based on a one-piece part, for example a one-piece stamped part, for example a foam stamped part, the soft part, which also encloses the appendage in the mentioned lateral direction, can thus be provided.

Based on the production state of the soft part, the edge area of the soft part, which is formed in this manner, thus a disk-shaped state, has appendages, which preferably project radially outwards. The appendages can be embodied in the same manner across the circumference and/or can be provided so as to be distributed equally across the circumference. All appendages can be embodied in the same manner relative to one another. More preferably, the appendages are embodied with a circumferential distance in circumferential direction. The circumferential distance can be provided by valleys between individual teeth, for example if the appendages are formed in a toothing-like manner. In a first section, the soft part, viewed in the assembled state, is adapted to a bottom plan view of the shell part. This bottom plan view and thus preferably the first section are circular, for example. The appendages are more preferably formed based on such a largest bottom plan view measure, in the case of the circle thus based on a largest radius of the bottom plan view. In the production state of the soft part, the individual appendages extend radially outside adjacent to the radius in this case. Accordingly, these appendages form a second section of the soft part. By folding up, it is preferably attained that, in the assembled state, the appendages rest against one another in circumferential direction at least across a part of their extension, in this assembled state thus in their upwards extension.

The soft part can consist of the foam, which has already been mentioned above. Preferably, it consists of a soft foam in this respect. The foam can be embodied in an open-pored manner. With regard to the soft part, reference is also made apart from that to the further explanations below.

The hard part can consist of a metallic material. It can be a steel part, for example. As compared to the soft part, the hard part preferably has a smaller thickness, based on the undeformed state thereof. More preferably, the thickness is ⅓ of the hard part or less up to ¹/₁₀ or ¹/₂₀ of the thickness of the soft part in the undeformed state. For example, the hard part can be formed as common washer, independent from the mentioned thickness.

The foot part can have a mounting edge, which can be connected to the appendage of the device for mounting the foot part or to which it is connected in the use state, respectively. With regard to a cross section, the mounting appendage can be embodied centrally. With regard to the appendage of the device, it can extend thereto on the inside. For this purpose, the appendage can be embodied cylindrically, for example, or as hollow body in any other shape, for instance also in terms of a square tube or multi-sided tube.

The foot part can interact with the appendage in a positive manner for a loss-proof mounting. The appendage can also be received in the shell section at a vertical overlap to the shell section. The positive connection can be attained by means of an overlap disk. For example, the overlap disk can be fastened to the mounting appendage in a positive manner, for example by means of a latching fastener, and to the appendage by resting thereon, for example.

The soft part can also be embodied in several parts. On the one hand, it can in particular form the impact surface for the appendage in the direction of the acting weight force as first part and, as second part, initially at radial or lateral distance to the appendage, respectively, in an area, in which the appendage can come to rest in response to displacement at right angles to the acting weight force. The two parts of the soft part can be separated by means of the hard part. A further part of the soft part can also be received in a shell section of the appendage, which is open to the bottom. It can also be clamp-mounted with the help of a hard part, on principle as described above with reference to the shell section of the foot part.

The capability of the soft part to consist of multiple parts, described as a whole, can also be used to the effect that soft parts comprising a differently adjusted hardness, are arranged. For example, the hardness can differ by 10 or more percent, up to 100%, for example.

A further possible solution of the task is at hand according to an idea of the invention in the case of a foot, which focuses on the fact that the foot part consists of a rubber-like soft material, that the soft part, which is connected directly to the foot part, consists of a foam, for example PUR foam, and that a thickness of the soft material, which is measured in the direction of a weight force, which is absorbed by the foot, corresponds to twice or several times up to twenty-times the thickness of the foot part. Preferably, the foot part is embodied in a rubber-like manner at least in the area of the base thereof, which furthermore counteracts in particular a moving or shifting, respectively, of the kitchen appliance with the feet thereof relative to the storage area, for example, table area.

More preferably, the foot part, which consists of a soft material, is connected directly to the soft part, for example adhered or welded thereto. Preferably, the soft part is a foam, more preferably a polyurethane foam. Accordingly, the soft part has good cushioning characteristics, in particular with regard to impacts, which are transferred out of the kitchen appliance to the foot via the appendage or the housing section.

With regard to the direction of the weight force of the kitchen appliance, which acts on the foot, in particular on the foot part, further with regard to a direction, viewed vertically to the base of the foot part, the soft part has a thickness, which provides for a sufficient cushioning, in particular of impacts, which are introduced vertically, and which allows for horizontal deformations, viewed at right angles to the thickness direction of the soft part. The rubber-like foot part, which is fastened directly to the soft part, hereby prevents that the soft part is damaged by friction to the storage surface of the kitchen appliance, for example in response to a shifting of the device.

Preferably, the thickness of the soft part corresponds to two-times to twenty-times the thickness of the foot part, more preferably to six-times to twelve times. More preferably, a soft part is used comprising a thickness of preferably of more than 5 mm, more preferably more than 6 mm up to 30 mm.

The embodiments, which are included, in particular with regard to the soft part, can be significant for all of the embodiments described herein.

More preferably, the foot part is an elastomer part, preferably a rigid, yet elastically deformable soft plastic part, which has reset characteristics.

In a further preferred embodiment, the appendage or housing section of the kitchen appliance is connected directly to the first soft part. An adhesive connection or a welded connection is thus preferred in this regard.

It is also preferred in this context to embody the housing section facing the first soft part as surface part, wherein, more preferably, a direct connection occurs between housing section and soft part via this surface. In a preferred embodiment, this results in a sandwich-like molding of the foot, comprising the arrangement of housing section, soft part and foot part, viewed in the direction of the weight force absorbed by the foot.

In an alternative embodiment, provision is made for a further soft part—this is a first soft part in the above-described sense—which is received in a shell section, which is open to the top, wherein the appendage or housing section rests on the further soft part. The shell section, which is open to the top, forms in particular a preferred circumferential limitation of an auxiliary space, which is provided by the shell section, for the further soft part. In response to movements of the appendage or of the housing section, this soft part can be compressed between the appendage or housing section and the wall of the shell section relative to the foot part in the overlap area to the appendage or the housing section.

The further soft part is hereby preferably arranged in the shell section in a loss-proof manner, but more preferably without a firmly bonded connection.

With regard to its Shore hardness, the further soft part is more preferably adjusted in such a manner that the appendage or housing section on the device side does not compress the soft part in such a manner that a quasi-rigid transition results in the case of a common maximum weight of the kitchen appliance. In fact, the hardness is chosen in such a manner that an elastic deflection can still occur in this event as well.

Preferably, the appendage or housing section is furthermore embodied so as to even be harder in particular as compared to the further soft part, in particular by embodying the appendage or housing section from hard plastic or metal.

In a preferred embodiment, the shell section rests on the further, lower soft part. The shell section, in particular the bottom section thereof, is accordingly held between the second and the first soft part in a sandwich-like manner.

Preferably, the further soft part is embodied in a circular ring-shaped manner, which supports an advantageous deformation of the further soft part, in particular at right angles to a weight force direction and the corresponding resetting capability.

The further soft part and/or the foot part are embodied in a circular disk-shaped manner in a preferred embodiment. With regard to other, preferably continuously plate-shaped embodiments of lower soft part and foot part are also possible, thus for example having a polygonal plan view. In particular in the case of circular disk-shaped embodiments of the lower soft part and/or of the foot part, an outer diameter is chosen, which corresponds to the outer diameter of the shell section, which might rest on the lower soft part.

With regard to the one soft part or both soft parts, it is preferably an open-pored or closed-opened foam, wherein closed-pored foam has advantages in particular in the context with a kitchen appliance.

It is also significant that the one soft part or both soft parts, preferably as a whole, in particular in the area, which might be impacted by the appendage or the housing section, is adjusted to be softer than the foot part, which preferably consists of a rubber-like soft material. The soft part or the soft parts accordingly have a lower Shore hardness than the foot part.

Preferably, the material of the one soft part or of both soft parts and the overlap of the appendage or of the housing section, respectively, to one of the soft parts is chosen or adjusted, respectively, in such a manner that a reset force of 5 N or more, preferably up to 15 N, more preferably up to approximately 10 N is reached in response to a displacement of one millimeter with regard to all of the feet of the kitchen appliance, which stand on a base (preferably: four feet).

In addition, it is preferred in this regard that the reset force in particular of the one soft part or of the plurality of soft parts (in each case) increases disproportionately with an increasing horizontal displacement of the appendages or housing sections, respectively, which overlap with the soft parts or the one soft part. A reset force, which corresponds to 2.1-times to 3-times, more preferably approximately to 2.5-times the reset value in the case of one millimeter, is thus preferably reached in response to a doubling of the horizontal displacement from one millimeter to 2 mm. Preferably, a reset force of the one soft part or of the two soft parts of approximately 25 N results in response to a horizontal displacement of 2 mm.

As mentioned, a soft part can consist of a foam. It can hereby not only consist of an open-pored or closed-pored, but also of a mixed-pored foam. A polyurethane foam is preferred, a mixed cellular polyurethane foam comprising partially closed and partially open pores is more preferable.

Preferably, a soft part has a tensile strength (minimum value according to DIN 53571) of between 0.5 and 1.5 N/mm$^2$, more preferably between 0.56 and 1.3 N/mm$^2$. In a preferred embodiment, provision is made for a tensile strength of 0.78 N/mm$^2$.

More preferably, a soft part is adjusted in such a manner that, following EN 826, a statistic elasticity module of between 0.05 and 1.3 N/mm$^2$ is reached, more preferably between 0.14 and 0.75 N/mm$^2$. In addition, provision is made for a dynamic elasticity module according to DIN 53513 of between 0.3 and 1.8 N/mm$^2$, more preferably between 0.6 and 1.3 N/mm$^2$.

With regard to the disclosure, the above and below-specified ranges or value ranges, respectively, or multiple ranges also include all intermediate values, in particular in 1/10 steps of the respective dimension, if applicable also without dimension, in particular 1.01-times, etc., on the one hand, for limiting the mentioned range limits from the bottom and/or the top, but in the alternative or in addition also with regard to the disclosure of one or a plurality of singular values form the respective specified range.

The invention will be specified below by means of the enclosed drawing, which, however, only represents exemplary embodiments. A part, which is only specified based on one of the exemplary embodiments and which has not (exactly) been replaced by a different part in the case of a further exemplary embodiment as a result of the special feature emphasized therein, is thus also described for this further exemplary embodiment as a part, which might be present in any event. In the drawing:

Figure 1:
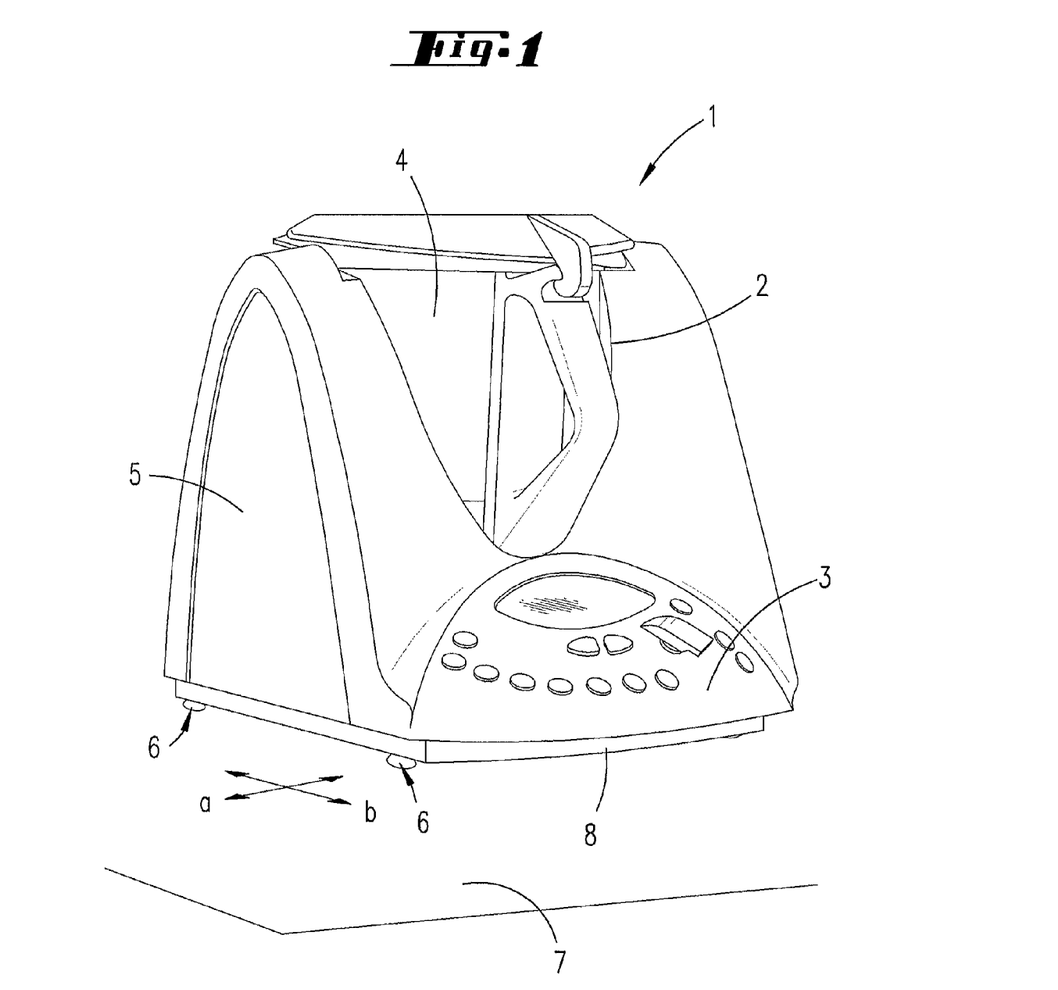
FIG. 1 shows a table-top kitchen appliance comprising feet for setting up the kitchen appliance on a table surface, in perspective illustration.

A kitchen appliance 1 comprising a mixing vessel receptacle and a control panel 3 is illustrated and described initially with regard to FIG. 1.

A mixing vessel 4 is assigned to the kitchen appliance 1. Said mixing vessel is located in the mixing vessel receptacle 2. Preferably, provision is made in the mixing vessel 4 for a mixing unit, which is assigned to a mixing vessel bottom and which can be driven via a non-illustrated electric drive, which is arranged in the kitchen appliance 1 below the receptacle 2.

The housing 5 of the kitchen appliance 1 is supported on a surface, here a table surface 7, via feet 6. The feet 6 are fastened on the bottom side of a housing bottom 8 for this purpose.

The kitchen appliance 1 is suitable to make doughs, among others. In such a dough mode, a high resistance is put up with the rotating mixing unit as a result of the toughness of the dough. The required drive torque of the motor is supported via the housing 5 and the feet 6, naturally also in the case of other motor operation. If the ball of dough is arranged in the mixing vessel 4 in a disadvantageous manner, the mixing unit might possible get stuck in the dough for a short period of time. As a result of this, the torque is increased for a short period of time. Such a torque surge is also compensated by the feet 6, so that the device does not suddenly or erratically rotate about its center of gravity. In addition and independent thereof, vibrations or in particular vertical impacts, respectively, are compensated in the direction of the table surface 7 via the feet 6.

The movement of the housing 5 in horizontal direction (see arrows a and b in FIG. 1) is permitted. The housing 5 can move relative to the feet 6 or, as will be specified in more detail below, relative to a partial section of the feet 6, respectively, in the horizontal plane. The energy, which might be introduced erratically, is converted into friction and/or reset and deformation energy. The feet 6 are hereby prevented from moving relative to the base, preferably only resting on the base—here the table surface 7—and by means of frictional connection. In addition, relative vertical movements of the housing 5, which is supported via the feet 6, in particular relative to a partial section of the feet 6, are also at hand as a result of the embodiment of the feet 6.

Each foot 6 is designed in a substantially two-part manner, wherein one part is provided so as to be fixed to the housing. This part, which is fixed to the housing, is preferably an appendage 9 or a housing section 10, which is molded or integrally molded on the housing side, in particular on the housing bottom side. In the case of an appendage 9, the latter preferably projects freely vertically downwards beyond the housing bottom surface, which is oriented downwards. In an alternative embodiment, the appendage 9 is connected to a weighing beam of a weighing device, preferably in a rigid manner, preferably above the housing bottom 8, with said weighing beam, in turn, engaging on the other end of the housing, in particular on the housing bottom side.

The appendage 9 or the housing section 10, respectively, is embodied as rigid part, more preferably together with the housing bottom 8 as a result of a one-piece, material-homogenous embodiment. Accordingly, the appendage 9 or the housing section 10 can be a hard plastic or a metal body, which is more preferably embodied in a rotationally symmetric manner with reference to a vertical axis x, which penetrates the appendage 9 or the housing section 10, respectively, centrally. In addition to the one-piece embodiment, provision is furthermore made as an alternative for an appendage 9 or a housing section 10, which can be fixed, for example screwed to the housing bottom 8 on the bottom side.

Figure 2:
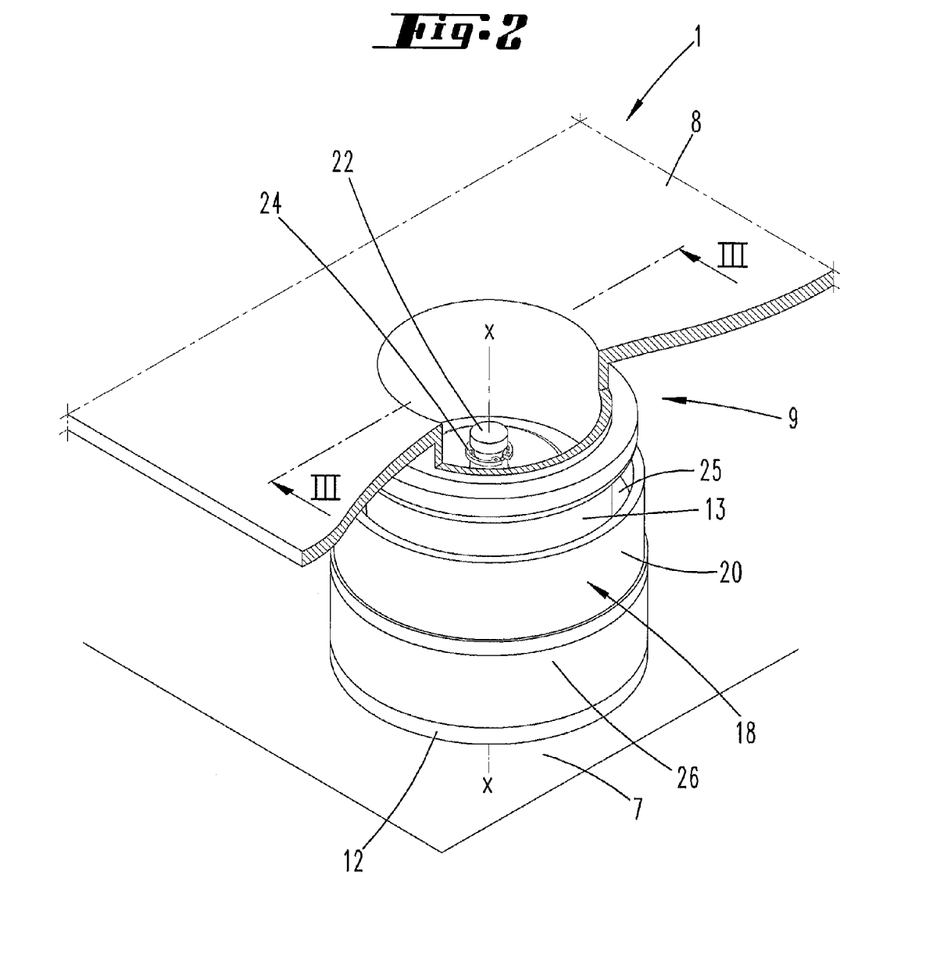
FIG. 2 shows a perspective, partially broken illustration, of a bottom area of the kitchen appliance comprising a foot in a first embodiment.
Figure 3:
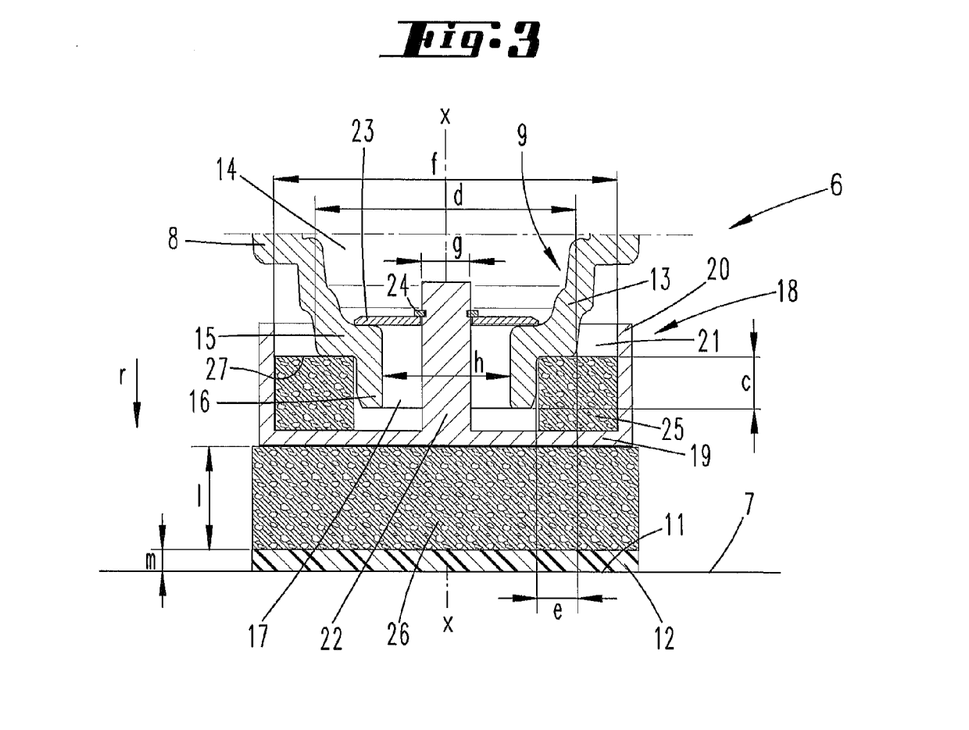
FIG. 3 shows the section according to line in FIG. 2, relating to a substantially unloaded basic position of the foot.

In the first exemplary embodiments illustrated in particular in FIGS. 2 and 3, the appendage 9 on the housing side rests substantially on a foot part 12, which forms a base 11.

The appendage 9 is substantially formed as rotationally symmetrical hollow body, comprising a circumferential appendage wall 13. A base 15 is inserted in one piece and preferably in a material-homogenous manner with the appendage wall 13 into the tube opening 14, which is comprised by the appendage wall 13, at a vertical distance to the outer edge of the appendage wall 13, which is free vertically downwards.

A tube section 16, which is arranged concentrically to the vertical axis x and the front surface of which, which is oriented vertically downwards, projects beyond the horizontal plane, which is defined by the free outer edge of the appendage wall 13, which is oriented downwards, is integrally molded to the base 15 on the bottom side, thus oriented vertically downwards. A vertical distance c between the front surface of the tube section 16, which extends in a horizontal plane, and the front outer edge of the appendage wall 13 preferably corresponds to one-half to one-tenth, more preferably approximately one-third of the outer diameter d of the appendage wall 13 in the area of the base 15.

The free radial clearance e between the outer wall side of the tube section 16 and the outer wall side of the appendage wall 13 in the area of the base 15 more preferably corresponds to approximately one-half to one-tenth, more preferably approximately one-seventh of the outer diameter d of the appendage wall.

The tube section 16 is centrally permeated by a circular-cylindrical aperture 17, which simultaneously also permeates the base 15.

Provision is more preferably made according to the first embodiment for a shell section 18, which is open vertically to the top. It has a shell bottom 19, which is more preferably shaped in a circular disk-like manner, and a circumferential, preferably cylindrical shell wall 20. The vertical height of the shell wall 20 preferably corresponds substantially to the vertical extension measure of the aperture 17 in the appendage 9.

The inner diameter f of the shell section 18 preferably corresponds to 1.1-times to 1.4-times the outer diameter d of the appendage wall 13, whereby an annular gap 21 appears circumferentially between the appendage wall 13 and the shell wall 20 in a basic orientation as illustrated in FIG. 3.

Starting at the surface of the shell bottom 19 on the inner side of the shell, a journal 22, which preferably has a circular disk-shaped and/or cylindrical cross section, grows. Said journal is preferably arranged centrally to the shell section 18 and is molded in one piece, in a material-homogenous manner with the shell section 18. The diameter g is hereby chosen so as to be smaller than the inner diameter h of the aperture 17 on the appendage side, wherein, with its front surface, which is oriented vertically upwards, the journal 22 projects beyond the plane of the appendage base 15, which is oriented upwards, passing through the aperture 17. A concentric arrangement of appendage 9 and shell section 18 results in a circumferential gap, the radial measure of which is preferably equal to or larger than the radial measure of the annular gap 21, between the journal 22 and the wall of the aperture 17.

The shell section 18 is mounted to the appendage 9 in a positive manner. For this purpose, provision is made for an overlap disk 23, which is centrally permeated by the journal 22 and which preferably rests against the surface of the base 15, which is oriented upwards. A collar 24, preferably in the form of a snap ring or the like, which is provided above the overlap disk 23 on the journal 22 on the outer wall side, chains the shell section 18 to the appendage 9 via the overlap disk 23, this by providing a vertical movability of the shell section 18 relative to the appendage 9, vertically upwards based on the illustration in FIG. 3.

Provision is made on the bottom side of the shell section 18 for a (second or further, if applicable) soft part 25. The latter is preferably designed so as to be circular ring-shaped and furthermore preferably consists of a soft foam. In the shell section 18, the soft part 25 rests on the shell bottom 19 and preferably has an outer diameter, which is adapted to the inner diameter of the shell wall 20. The inner diameter of the shell wall 20 is also referred to above as largest bottom plan view measure. More preferably, the free inner diameter of the soft part 25 is adapted to the outer diameter of the tube section 16 on the appendage side, wherein, more preferably, the circular ring inner diameter of the soft part 25 corresponds approximately to 1.01 to 1.1-times the outer diameter of the tube section.

In a preferred embodiment, the soft part 25 is only held in the shell section 18 by means of frictional or positive connection. In an alternative embodiment, a fastening is also possible in this regard, for example as a result of adhesion.

More preferably, the vertical height of the soft part 25 corresponds approximately to two-thirds of the height of the shell wall 18, wherein vertical heights of the soft part 25 of preferably one-fifth to seven-eighths of the shell wall height are also possible.

The arrangement is preferably furthermore chosen in such a manner that, in an unloaded basic position according to the illustration in FIG. 3 (and also according to the illustrations in FIGS. 9, 10 and 13), the appendage 9 rests with the free front outer edge of the appendage wall 13, which is oriented downwards, or with the bottom side of the base 15, respectively, radially outside of the tube section 16 on the annular surface, the impact surface 27, of the soft part 25, which is oriented upwards, while the tube section 16 of the appendage 9 dips into the ring opening of the soft part 25, this preferably with a vertical distance of the tube section front surface, which is oriented downwards, to the facing surface of the shell bottom 19 or of the impact surface 27 (FIGS. 9, 10) of the soft part 25. It can also rest directly (FIG. 9 on the hard part 28, FIG. 10 directly on the soft part). More preferably, this position is furthermore the telescope-extended position of appendage 9 and shell section 18, in which position the journal 22 is supported with its collar 24 on the upper side of the overlapping disk 23, with the latter, in turn, preferably resting on the facing surface of the base 15 on the appendage side.

With regard to the hardness, the soft part 25 is preferably adjusted in such a manner that the latter is preferably not compressed in a basic load (in consideration of a maximum total weight of the kitchen appliance 1 and in the case of a non-activated mixing unit) or is only compressed insignificantly via the appendage wall 13.

More preferably, the shell section 18 rests on a (first or further, respectively) soft part 26. This can also be at hand by means of the foot part 12, which is preferably an elastomer part (for example TPE). Preferably, this is also a soft foam, more preferably polyurethane foam. The shell section 18 hereby preferably rests completely on the facing surface of the soft part 26 with the smooth surface of the base 15, which is oriented downwards. More preferably, the shell section 18 and the soft part 26 are adhered to one another, thus in particular adhesively bonded.

In a section at right angles to the vertical axis x, the soft part 26 is preferably designed in the same manner as the shell section 18, so that a circular disk-shaped embodiment of the soft part 26 is preferably at hand here. In preferred embodiment, the diameter of the soft part 26 corresponds to the outer diameter of the shell wall 20.

The thickness l of the soft part 26, viewed in the direction of the weight force (arrow r) received by the foot 6, preferably corresponds to one-half to one-eighth of the soft part diameter, more preferably approximately to one-fourth. On the bottom side, that is, facing away from the shell section 18, the soft part 26 is provided with the preferably plate-shaped foot part 12, which has already been mentioned. This foot part 12 can preferably consist of the mentioned TPE or of a rubber-like soft material, in particular in the form of an elastomer part.

The foot part 12 preferably has the same diameter as the soft part 26.

The thickness m of the foot part 12, viewed in the direction of the arrow r, is hereby chosen in such a manner that the thickness l of the soft part 26 corresponds to two-times to twenty-times the thickness m of the foot part 12, more preferably approximately to four-times to five-times.

Preferably, the foot part 12 is connected directly to the soft part 26 in an adhesive manner.

A foot part 12 is also preferably realized in each case in the embodiments of FIGS. 5 to 13. Here, more preferably attached directly on a bottom side or on a bottom of the shell section 18, respectively.

An impact load, which occurs on principle in response to a common operation of the kitchen appliance 1, acts in vertical as well as in horizontal direction. Accordingly, the circular ring-shaped soft part 25 in the shell section 18 is acted upon by the tube section 16, from vertically upwards through the appendage wall 13 as well as from radially inwards to radially outwards in the area of the soft part circular ring opening.

The appendage 9 as a whole is supported so as to be cushioned in all of the impact-relevant directions by means of the soft part 25, wherein the soft part 25 is preferably designed in such a manner that it tends to push the appendage 9 into the initial position according to FIG. 3 in each case via the elastic reset capabilities. The hardness of the soft part 25 is furthermore chosen in such a manner that, in the case of common vertical impact loads, in particular in response to proper use of the kitchen appliance 1, that is, further in response to proper maximum filling of the mixing vessel 4, the free front surface of the tube section 16, which is oriented downwards, maintains a vertical distance to the facing surface of the shell bottom 19, even in the maximum load.

The shell section 18 as a whole, in turn, is supported so as to be cushioned by means of the soft part 26 in all of the impact-relevant directions. The soft part 26 is preferably also designed in such a manner that it tends to push the shell section 18 into the initial position according to FIG. 3 via the elastic reset capabilities.

As a result of the arrangement in particular of the soft part 26 as well as of the preferred direct fastening of the soft part 26 with the shell bottom 19, more preferably also with the foot part 12, the stability of the kitchen appliance 1 as a whole is improved, wherein the rubber-like foot part 12 prevents that the soft part 26 is damaged by friction relative to the table surface 7, for example in response to shifting the kitchen appliance 1.

The surface of the foot part 12, which is oriented downwards, hereby forms the base 10 for interaction with the table surface 7, for example.

Figure 4:
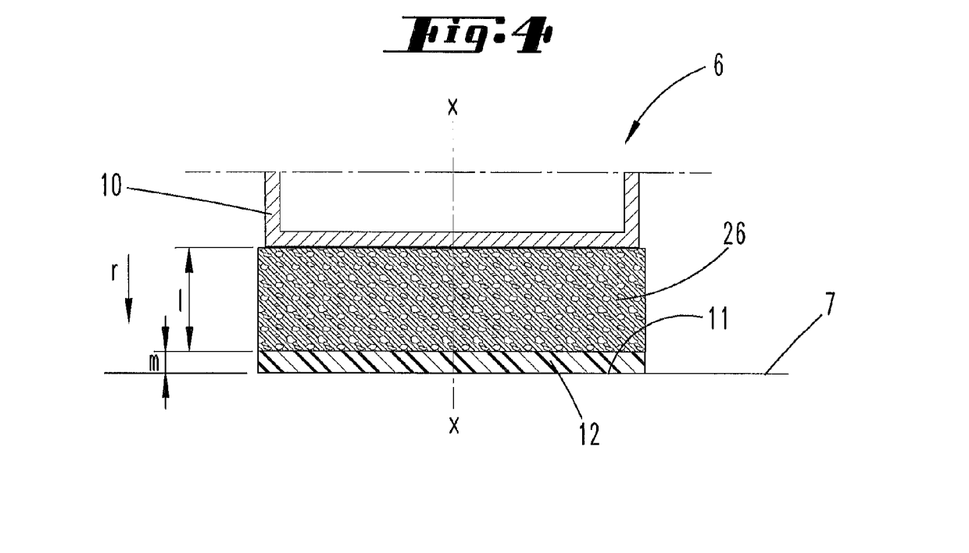
FIG. 4 shows an illustration, which corresponds to FIG. 3, relating to a second embodiment of the foot.

FIG. 4 shows an alternative embodiment of the foot 6. A sandwich-like design is preferred here. An embodiment of the foot 6 with regard to a vertical axis x, which is preferably rotationally symmetrical as a whole, also results in a circular disk-shaped foot part 12 in this embodiment, which is connected directly to a circular disk-shaped soft part 26 in the form of a foam part in the area of a flat surface. An adhesive connection is also preferred in this regard.

With its surface, which faces away from the foot part 12, the soft part 26 is connected directly and to a housing section 10 of the kitchen appliance 1. Preferably, an adhesive connection is used here.

Preferably facing the soft part 26, the housing section 10 has a flat surface, in particular for a holohedral adhesion to the soft part 26.

In a preferred embodiment, the housing section 10 is part of the housing bottom 8, hereby preferably extends below a bottom plane, which is generally oriented downwards. According to the afore-described exemplary embodiment, the housing section 10 as well as the appendage 9 can also extend above the bottom plane and can hereby be a part of a weighing beam, for example.

Viewed in the direction of the arrow r, a thickness l of the soft part 26 of at least 6 mm to 30 mm is preferred. With regard to the thickness ratios of soft part and foot part 12, reference is made to the explanations relating to the afore-described exemplary embodiment. Independent therefrom or in combination thereto, the soft part 25 can have a thickness of between 2 and 10 mm.

Instead of the foot part 12 in the form of a rubber-like soft material, the soft foam of the soft part 26 forms a skin at least on the side, which faces the bearing surface—here table surface 7—or, in the alternative, is coated with a corresponding plastic skin in a further embodiment. This skin prevents damages to the foam in response to a shifting of the device on the table surface 7. In terms of the invention, the skin embodies the foot part 12 with the base 11.

Figure 5:
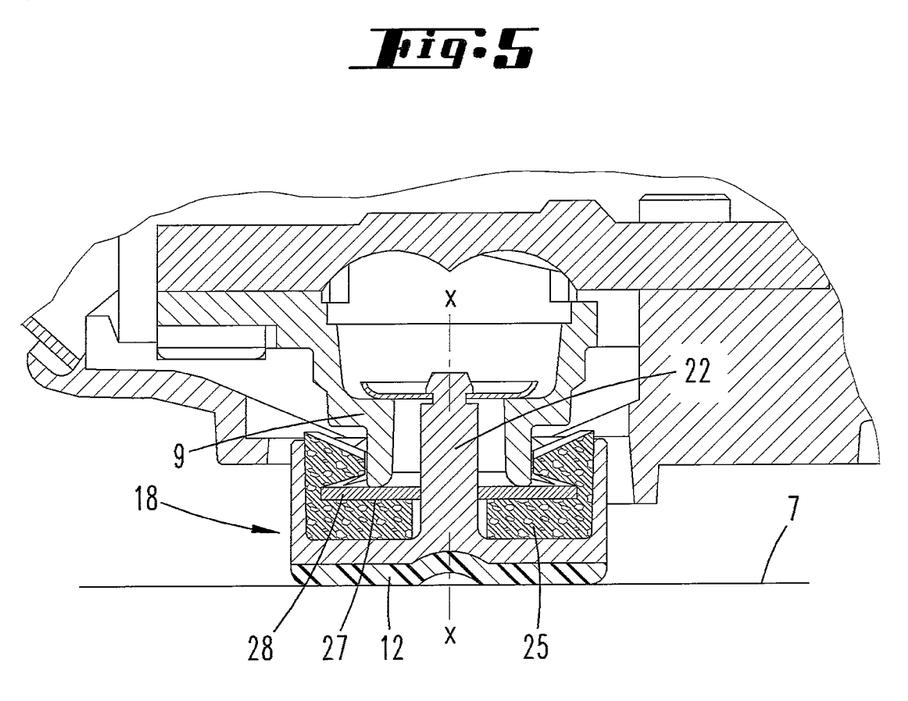
FIG. 5 shows a further cross sectional view of the lower area of the kitchen appliance, comprising an attached foot.

FIG. 5 represents a further embodiment, in the case of which the soft part 25 also extends from the impact surface 27 upwards, laterally to the appendage 9, also without weight loading from the appendage 9. The appendage 9 hereby does not reach downwards beyond the impact surface 27. In a further detail, the appendage 9 rests on the impact surface 27 by means of a hard part 28. The hard part 28 can be formed by means of a common washer, for example. Above the hard part 28, the soft part 25 can reach close to or touching an outer surface of the appendage 9 in the illustrated exemplary embodiment. However, a radial distance is preferred, for example in the area of the wall thickness of the appendage 9, which is formed in a tube-shaped manner at that location.

Figure 9:
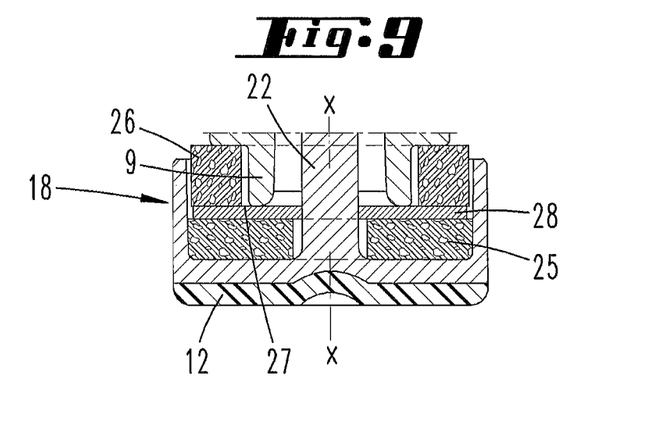
FIG. 9 shows a cross sectional view of a foot in a further embodiment.

The impact surface 27 preferably refers to that surface of a soft part, which receives a weight force through the appendage 9 by means of the lower free front surface thereof. In the embodiment of FIG. 3, the impact surface 27, however, receives the corresponding force by means of the stepped surfaces of the base 15. In the embodiments of FIGS. 5 and 9, the soft part 25 also absorbs the force only indirectly by means of the hard part 28 by means of its impact surface 27. In addition, an additional absorption of the weight force by the upper soft part or an upper section of the soft part is at hand in the exemplary embodiments of FIGS. 9 and 10, introduced via a corresponding stepped surface of the base 15 of the appendage 9.

Figure 13:
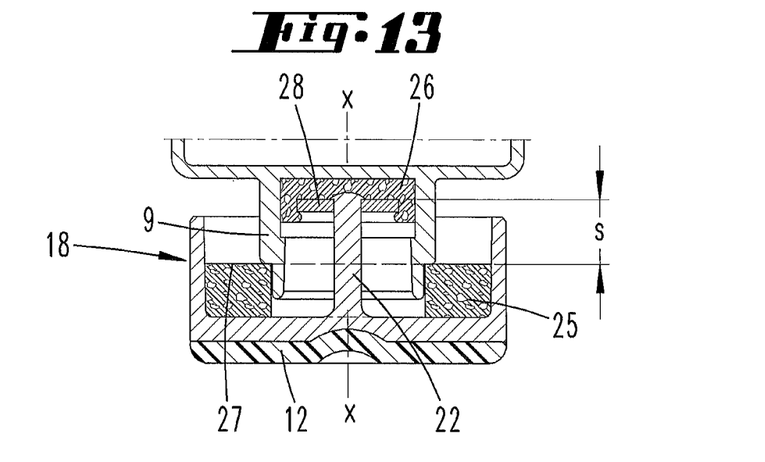
FIG. 13 shows a cross sectional view of a foot in a further embodiment.

In the embodiment of FIG. 13, the introduction of the weight force to the soft part 25 is also only at hand through the corresponding surface of the bottom (stepped section) of the appendage 9. In addition, the introduction of the weight force with regard to the upper soft part 26, is at hand through a surface of the housing bottom or of the appendage 9, respectively, which acts thereon, preferably spans the soft part as a whole.

Preferably, the appendage 9 can move to a certain extent in lateral direction on the hard part 28. Corresponding movements of the kitchen appliance can thus be received advantageously.

In the exemplary embodiment of FIG. 5, the foot part 12 is furthermore also embodied below the shell section 18, here in the form of an elastomer part. It is preferably adhered to the bottom side of the shell section 18.

The mounting of the shell section 18 on the appendage 9 is preferably realized according to the embodiment of FIG. 3—and also in the illustrated exemplary embodiment—so that reference can be made thereto in more detail.

Figure 6:
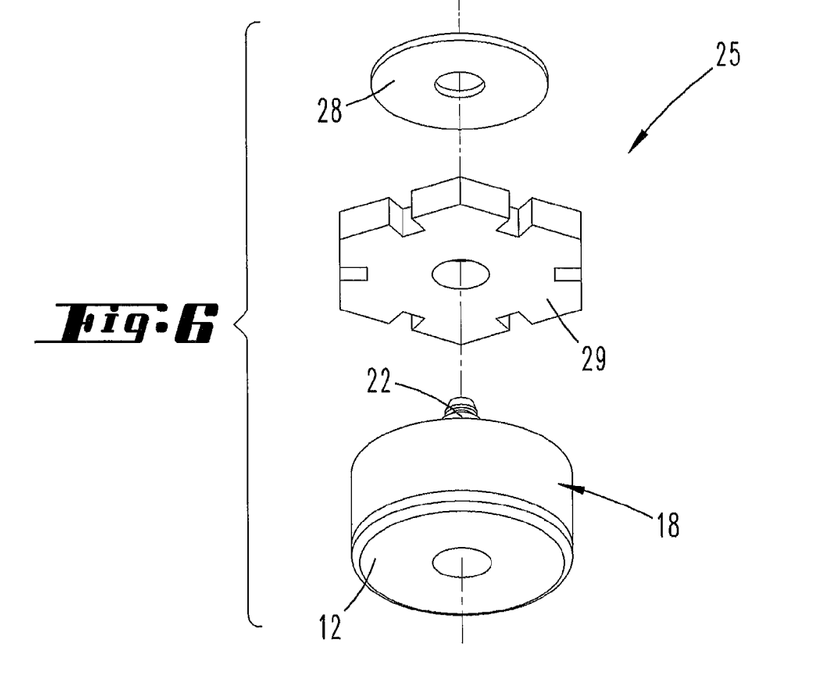
FIG. 6 shows the foot according to FIG. 5 in exploded illustration.
Figure 7:
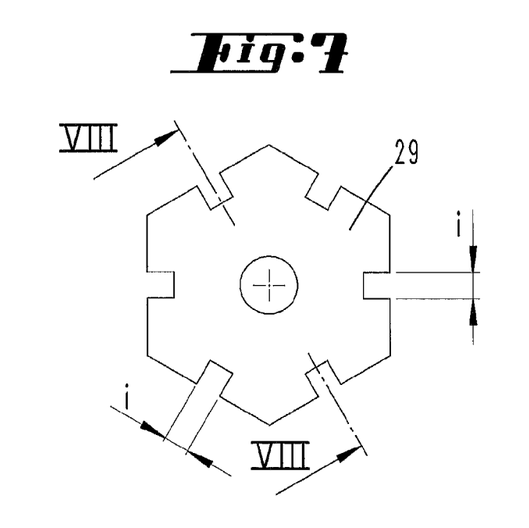
FIG. 7 shows a top view onto the soft part of the foot according to FIG. 5 or FIG. 6, respectively.
Figure 8:
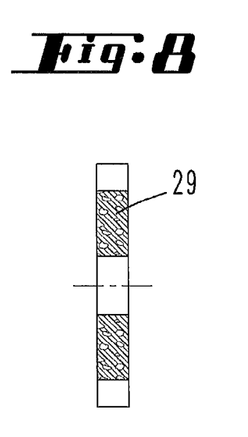
FIG. 8 shows a cross section through the subject matter of FIG. 7, cut along line VIII-VIII.

As furthermore follows from FIGS. 6 to 8, the soft part 25 of the embodiment of FIG. 5 is formed from a foam part, for example made by a profile cut, in particular a foam blank, which has individual appendages 29, which are evenly distributed across the circumference and which project outwards. The appendages are formed in an apparent arrow-like plan view outline. A plurality, in the case of the exemplary embodiment six, appendages are provided so as to be evenly distributed across the circumference. A distance i is embodied between the appendages in circumferential direction. Valleys are thus created between the individual appendages 29. Radially inwards, the distance i reaches to a measure, which corresponds approximately to a largest free plan view measure of the bottom of the shell section.

In the assembled state according to FIG. 5, the appendages 29 are bent over or folded upwards. As a result of their elastic reset force, they rest against an inner surface of the shell section 18. Through this, they are simultaneously mounted in the shell section by means of the frictional connection. This mounting is clearly reinforced by the effect of the hard part 28, which leads to a comparatively strong compression in the area of the hard part 28 (laterally). This is so because of the preferred embodiment that a maximum measure of the hard part 28, in response to a circular embodiment, thus an outer diameter, has a measure, which is larger than it corresponds to the remaining inner diameter when bending over or folding the soft part upwards. A particular thickening of the soft part thus results in this area.

A further embodiment is illustrated with reference to FIG. 9. It differs from the embodiment of FIG. 5 in that the hard part 28 separates a first soft part 25 and, in this embodiment, a further soft part 26, which is arranged thereabove, from one another. Preferably, the two soft parts are in each case a circular ring-shaped part. The inner diameter of the upper soft part 26 is significantly larger. For example, the inner diameter is larger than the inner diameter of the lower soft part by the measure of the thickness (unloaded state) of the soft part 25 or 26.

While a lower area of the appendage 9 extends into the upper soft part 26 in the area of the inner clearance, which is defined by the mentioned inner diameter, and rests on the hard part 28, the soft part 25 is not permeated by the appendage 9. With regard to the upper soft part 26, the cross section of the appendage 9 is formed in a stepped manner.

A vertical stepped section is in lateral overlap (inside) to the upper soft part 26, while the appendage 9 rests on the soft part 26 (which forms a further impact surface in this regard) by means of a horizontal stepped section. Reference is to be made to the stepped embodiment according to the embodiment of FIG. 3 (in particular with regard to the parts referred to with reference numerals 15 and 16).

Figure 10:
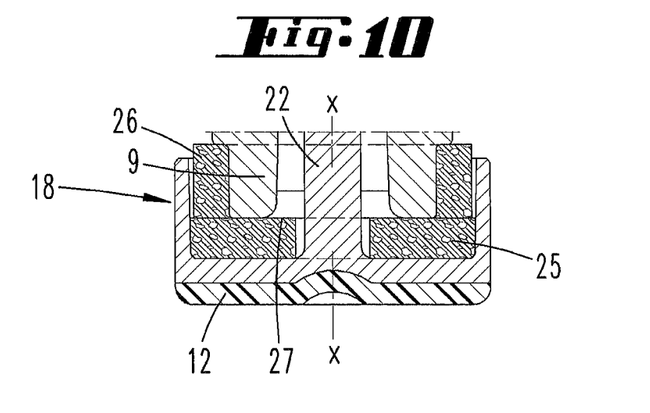
FIG. 10 shows a cross sectional view of a foot in a further embodiment.

The embodiment of FIG. 10 corresponds to the embodiment of FIG. 9, wherein, however, provision is not made for a hard part 28 here. In fact, a lower front surface of the appendage 9 rests directly on the impact surface 27 of the lower soft part 25. It is furthermore preferred, as is apparent, that the appendage 9 is also embodied with a larger wall thickness, so that a smaller surface loading pressure results with regard to the soft part 25. A wall thickness can be between 0.5-times and 1.5-times, preferably approximately 1-times the vertical thickness of the soft part 25.

Figure 11:
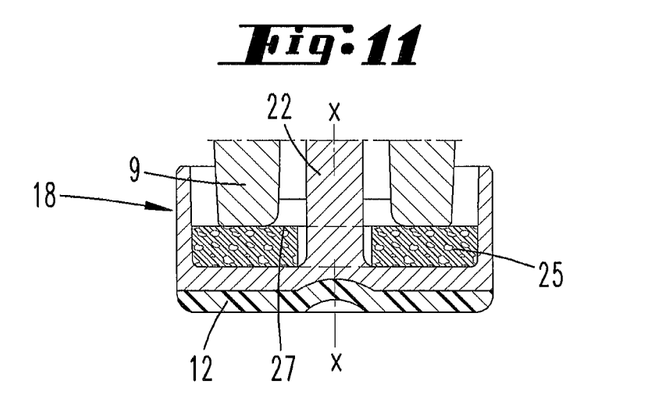
FIG. 11 shows a cross sectional view of a foot in a further embodiment.

In the embodiment according to FIG. 11, provision is only made for a soft part, according to the lower soft part 25 of FIGS. 9 and 10. This soft part is similarly formed in a circular ring-shaped manner. The appendage 9 rests directly on the upper side, the impact surface 27. A lateral impacting of the appendage 9 by the soft part 25 only follows here as a result of the weight loading and corresponding sinking of the appendage 9 into the soft part 25. The inner diameter is comparatively small. It is preferably adapted to the outer diameter of the journal 22. The wall thickness of the appendage 9 is also preferably chosen here to be comparatively large. In such a manner that the lower front surface, with which it rests on the soft part, is designed so as to be comparatively large. The wall thickness can correspond 0.5-times to 1.5-times, preferably 1-times the vertical thickness of the soft part 25, for example. Due to the circular ring-shaped, continuous, closed lower front surface of the appendage 9, this results in a desired (comparatively small) surface pressure to the soft part 25.

Figure 12:
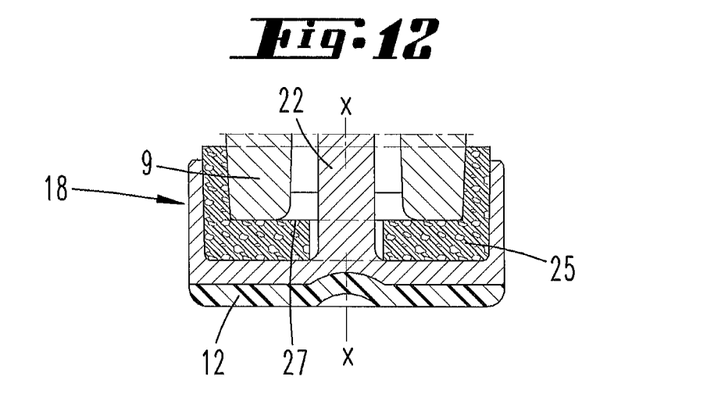
FIG. 12 shows a cross sectional view of a foot in a further embodiment.

On principle, the embodiment of FIG. 12 corresponds to the embodiment of FIG. 5, but provision is also not made here for a hard part 28. In fact, the appendage 9 rests directly on the impact surface 27 of the soft part 25 with its lower front surface, here also with correspondingly preferred larger wall thickness. Provision is in particular not made here for a stepped surface of the appendage 9 (in the area of a base 15), which might still rest additionally on the turned-up area of the soft part 25 (the front surface thereof). The soft part 25 can be formed as foam profile cut so as to be adapted directly to the interior of the shell section 18. Here as (foamed or milled) soft part, which is produced directly integrally, for example, in its three-dimensional shell-like shape. According to the explanation relating to FIGS. 6 to 8, it can also be formed with appendages or also with a continuous edge. The edge can be bent upwards or folded over by pressing the soft part 25 into the shell section 18.

In the embodiment of FIG. 13, a stepped section is initially embodied on the bottom side relative to the appendage 9, as it is described with reference to the embodiment of FIG. 9 with regard to the interaction with the upper soft part 26. The appendage sits in an inner opening of the soft part 25 with a vertical stepped section, while it rests directly on an upper impact surface 27 of the soft part 25 with an upper stepped section.

In addition, however, the upper side of the appendage 9 is formed in the shape of a shell section, which is open towards the bottom, in which a second soft part 26 is received. This second soft part 26 is preferably mounted in the same manner, by means of a hard part 28, as is described with regard to FIG. 5 with reference to the mounting of the soft part 25 in the shell section 18.

In the embodiment of FIG. 13, the surface ratios of the bearing area of the appendage 9 on the (lower) soft part 25 are preferably provided in such a manner that at least half of the weight force, which is transferred by the appendage 9, but preferably predominantly, approximately up to ¾ or ⅝ is absorbed by the lower soft part 25. Accordingly, the upper soft part 26 can mainly have the function of absorbing shifts of the housing relative to the table surface or another bearing surface at right angles to the effect of the weight force.

In the alternative, provision can also be made, in particular when the hard part 28 is embodied integrally in one piece or fixedly connected to the journal 22, for a large portion of the weight force to be absorbed there. An inverse relationship can thus also be attained, namely that the mentioned significant part of the weight force, also to the mentioned extent, is actually absorbed on the top by the soft part 26, and that the soft part 25 serves essentially or only to absorb the mentioned displacement tendencies at right angles to the effect of the weight force. In particular in this case, the front surface of the appendage 9, which transfers the force, can also be embodied so as to be significantly larger than is illustrated in FIG. 13.

A vertical distance s between the impact surfaces of the lower soft part 25 and of the upper soft part 26 is preferably ¼ of the outer diameter d, as it is described in FIG. 3, reduced (2-times) by the distance e, up to half, ¾ or a whole of a corresponding size.

LIST OF REFERENCE NUMERALS 1 kitchen appliance
2 mixing vessel receptacle
3 control panel
4 mixing vessel
5 housing
6 foot
7 table surface
8 housing bottom
9 appendage
10 housing section
11 base
12 foot part
13 appendage wall
14 tube opening
15 base
16 tube section
17 aperture
18 shell section
19 shell bottom
20 shell wall
21 annular gap
22 journal
23 overlap disk
24 collar
25 soft part
26 soft part
a direction of movement
b direction of movement
c distance
d outer diameter
e distance
f inner diameter
g diameter
h diameter
x vertical axis m thickness
l thickness
r arrow
i distance
s distance

The invention claimed is:

1. A foot of a device for supporting the device on a floor, the device having a housing, wherein the foot comprises:
an appendage of the housing,
a foot part forming a base,
a shell section resting on the foot part, a soft part received by the shell section, and an overlap disc,
wherein the base in use is in direct contact with the floor,
wherein the shell section is open toward a top portion of the shell section,
wherein the appendage projects into the shell section,
wherein the appendage is movably received in the shell section at right angles to a deflection movement as a result of a weight force of the device,
wherein the soft part furthermore forms an upper impact surface for the appendage, wherein a top part of a lateral portion of the soft part is embodied without a weight-loading by the appendage,
wherein the lateral portion of the soft part starts at an end of the upper impact surface, wherein the top part of the lateral portion of the soft part extends upwards higher than the upper impact surface,
wherein the appendage is supported so as to be cushioned in all impact-relevant directions via the soft part,
wherein the appendage comprises an appendage base and a tube section connected to the appendage base, the appendage base comprising an upward-oriented surface, the tube section being oriented vertically downwards with respect to the appendage base and overlapping with the shell section,
wherein the shell section comprises a journal molded in one piece with the shell section, the journal being cylindrical and having a circular cross-section,
wherein the journal centrally permeates the tube section of the appendage and projects beyond a plane of the appendage base,
wherein the journal centrally permeates the overlap disc and the overlap disc rests against the upward-oriented surface of the appendage base, and
wherein the shell section is mounted to the appendage in a positive manner via the overlap disc.

2. The foot according to claim 1, further comprising a hard part, wherein the appendage rests on the soft part via the hard part, wherein the hard part is clamp-mounted by the lateral portion of the soft part, wherein the appendage is received in the shell section so as to be vertically movable, and wherein the appendage is also received in the shell section so as to be horizontally movable.

3. The foot according to claim 1, wherein the appendage interacts with the soft part by resting on the upper impact surface of the soft part and by interacting with a free side surface of the soft part, in response to a relative movability of the appendage to the side surface.

4. The foot according to claim 1, wherein the foot part comprises a rubber-like soft material, wherein the soft part comprises a foam, wherein a thickness of material of the soft part corresponds to at least twice a thickness of the foot part, and wherein the thickness of the material of the soft part and the thickness of the foot part are measured in a direction of a weight force absorbed by the foot part.

5. The foot according to claim 1, wherein the shell section rests on a lower soft part or
wherein the soft part is embodied in a circular ring-shaped manner or
wherein a lower soft part or the foot part is embodied in a circular disk-shaped manner.

6. The foot according to claim 1, wherein the soft part is designed at least partially in a circular ring-shaped manner.

7. The foot according to claim 1, wherein material of the soft part and the overlap of the appendage to the soft part is chosen or adjusted, respectively, in such a manner that when the foot stands on the floor a reset force of 5 N or more is reached in response to a horizontal displacement of 1 mm.

8. The foot according to claim 1, wherein when the foot stands on the floor a reset force of the foot in response to a horizontal displacement increases disproportionately with an increasing horizontal displacement.

* * * * *